United States Patent [19]
Yamashita

[11] Patent Number: 6,097,739
[45] Date of Patent: Aug. 1, 2000

[54] DATA TRANSFER RATE CONTROL METHOD AND DATA TRANSFER RATE CONTROLLER

[75] Inventor: Hiroaki Yamashita, Fukuoka, Japan

[73] Assignee: Fujitsu Limited, Kanagawa, Japan

[21] Appl. No.: 08/841,872

[22] Filed: May 5, 1997

[30] Foreign Application Priority Data

Mar. 9, 1996 [JP] Japan ................................ 8-232677

[51] Int. Cl.⁷ ...................................... H04J 3/07
[52] U.S. Cl. ..................... 370/528; 370/395; 370/465; 370/505
[58] Field of Search ................. 370/468, 394, 370/465, 505, 516, 517, 519, 395, 230, 235, 236, 506, 433, 528; 375/371, 363

[56] References Cited

U.S. PATENT DOCUMENTS

| | | | |
|---|---|---|---|
| 5,509,001 | 4/1996 | Tachibana et al. | 370/230 |
| 5,534,937 | 7/1996 | Zhu et al. | 348/845.1 |
| 5,561,791 | 10/1996 | Mendelson et al. | 395/200.63 |
| 5,563,884 | 10/1996 | Fimoff et al. | 370/391 |
| 5,650,825 | 7/1997 | Naimpally et al. | 348/465 |

FOREIGN PATENT DOCUMENTS

| | | |
|---|---|---|
| 4-252535 | 9/1992 | Japan . |
| 7-336341 | 12/1995 | Japan . |

*Primary Examiner*—Huy D. Vu
*Assistant Examiner*—Dung Trinh
*Attorney, Agent, or Firm*—Helgott & Karas, P.C.

[57] ABSTRACT

A data transfer rate control method inserts a stuff packet in real time to resolve the problem present in an ATM transmission for MPEG data. The method, for controlling a data transfer rate at which coded data are transferred in an asynchronous transfer mode may include the steps of: forming the coded data for an AAL layer (ATM Adaptation Layer); calculating an insertion timing for insertion of a NULL packet; inserting the NULL packet into the coded data of the AAL layer in consonance with the insertion timing, obtained by the calculation, for the NULL packet; and transferring, in the asynchronous transfer mode, the coded data of the AAL layer into which the NULL packet is inserted.

7 Claims, 13 Drawing Sheets

DATA TRANSFER RATE CONTROL METHOD AND DATA TRANSFER RATE CONTROLLER

BACKGROUND OF THE INVENTION

1. Field of the Invention

The present invention relates to a rate control method whereby a system for providing a multimedia service across a network, such as video on demand (hereinafter referred to as a VOD), transmits to the network multimedia data, such as video/audio data, at a requested speed.

2. Related Arts

Because of the standardization of digital audio/video coding systems, such as ISO/MPEG (Moving Picture Expert Group)-2, and the expansion of networks using B-ISDN and ATM (Asynchronous Mode Transfer)-LAN, VOD service and various other bidirectional multimedia services can be realized.

VOD is a system that is constituted by a server (video server) for storing in a cumulative medium, such as a hard disk, a larger quantity of video data that are encoded in advance, and for distributing video data to a client upon the client's request, a client for displaying contents of a request for information issued by a subscriber and video data that are supplied; and a wide network (an ATM network) that can cope with a transfer and an exchange of video data.

FIG. 11 is a diagram illustrating the general configuration of a VOD service system. A video server 100 and a client 200 are connected to an ATM network 300, and upon receipt of a request from the client, MPEG2 data is transmitted by the server 100.

The video server 100 includes a storage device 101, such as a hard disk; a data transfer section 102; and a controller 103 for controlling these components. The client 200 includes a data receiver 210; an MPEG decoder 202; and a controller 203 for controlling these components.

A mapping method (MPEG over ATM) for mapping MPEG data over an ATM cell, which is used to transfer MPEG2 data, has been standardized by an ATM forum. The contents of the mapping are shown in FIGS. 12A, 12B and 12C. This standard will also be adopted by DAVIC, which is an organization established for the standardization of VOD systems.

Every two TS packets AA (188 bytes) (see FIG. 12A) of MPEG2 data are defined as a packet AAL5 (CPCS-PDU), and a trailer BB of eight bytes is added to the packet AAL5 to define a CPCS-PDU (AAL5 packet) (see FIG. 12B). Thereafter, the CPCS-PDU is disassembled to form eight ATM cells for transmission to a network. It should be noted that an ATM header DD of five bytes is provided for each ATM cell (see FIG. 12C).

To realize the video server 100, the MPEG data must be transmitted in the format shown in FIG. 12 that conforms to the system determined by the MPEG over ATM method. Another important function is control of the rate at which the ATM cells are transmitted to the network. This is the control for maintaining the speed at which the video contents are coded for transmission of the ATM cells to the network.

When this control is not performed precisely (clock precision: on an order of several tens of ppm, if available), a one-hour program, for example, will be ended within 59 minutes.

Taking the function of the video server 100 into account, since a conversion process between the AAL/ATM layers in FIGS. 12A through 12C is performed and an ATM cell is transmitted, a transmission queue is so controlled that it is never empty in order to maintain communication with a fixed rate.

A problem encountered here is that the value for a rate that can be set for the AAL/ATM layer conversion is a discrete value. That is, since cell transmission timing is generated by counting source clocks that are input for such control, the rate value can not help but be a discrete value.

In general, when the transfer speed does not match the data coding speed, stuff data (a packet) is inserted to absorb a difference in the speeds. An example structure is shown in FIG. 13. In FIG. 13, a buffer circuit 50, a multiplexer 51 and a stuff packet generator 52 are provided in the structure.

The buffer circuit 50 reads and fetches coded data in consonance with a coding clock timing, and transmits that data in consonance with a transmission clock timing. The stuff packet generator 52 detects an underflow for the data accumulated in the buffer circuit 50 and transmits stuff data (a packet) to the multiplexer 51 for insertion in the data.

If the same structure is to be applied for the coded data sent from the video server 100, however, a clock for coding can not be reproduced because the coded data from the video server 100 is stored in the storage device 101. Therefore, the configuration in FIG. 13 can not be applied.

In order to match the MPEG coding rate for information contents and the transmission rate for ATM cells, either (a) the information contents are coded at a coding rate that corresponds to the ATM cell transmission rate, or (b) an analog adjustment of an oscillator is performed that provides for the transmission rate a reference frequency that is in consonance with the coding speed.

With the remedial process (a), however, various vendors can not cope with the data contents, and the flexibility of the system will be lost. With the remedial process (b), since the coding rates for a number of different types of data contents are supported, a plurality of ATM interface sections, on which are mounted oscillators having different frequencies, must be provided for the individual transmission rates, with the result that there will be an increase in the system costs.

SUMMARY OF THE INVENTION

Focusing on the fact that a CPU in an ATM interface section controls the transmission of an AAL5 packet, it is one object of the present invention to provide a data transfer rate control method, and an apparatus therefor, whereby a CPU inserts the transmission of a stuff packet in real time, thereby resolving the above shortcomings.

To achieve the above object, according to the present invention, a method, for controlling a data transfer rate at which coded data are transferred in an asynchronous transfer mode, includes the steps of:

forming the coded data for an AAL layer;

calculating an insertion timing for insertion of a NULL packet;

inserting the NULL packet into the coded data of the AAL layer in consonance with the insertion timing, obtained by the calculation, for the NULL packet; and transferring, in the asynchronous transfer mode, the coded data of the AAL layer into which the NULL packet is inserted.

Other objects of the present invention will become obvious during the course of the following explanation of the preferred embodiment of the present invention.

DETAILED DESCRIPTION OF THE PREFERRED EMBODIMENT

Figure 1:
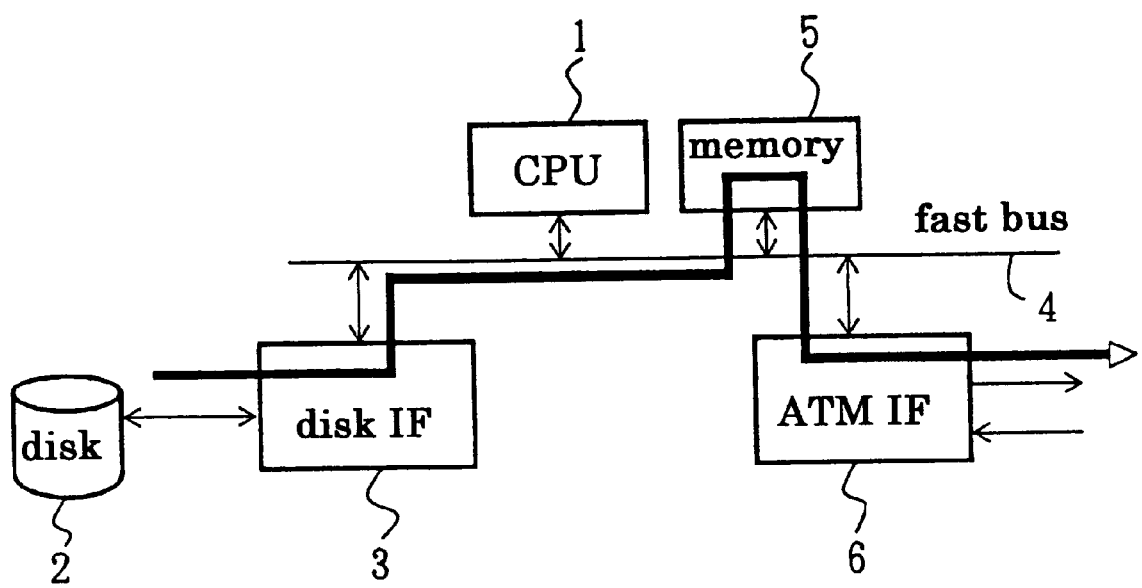
FIG. 1 is a block diagram illustrating an example arrangement for a video server to which the present invention is applied.

The preferred embodiment of the present invention will now be described while referring to the accompanying drawings. The same reference numerals are used throughout to denote corresponding or identical components in the drawings.

FIG. 1 is a block diagram illustrating an example arrangement for a video server to which the present invention is applied. Under the control of a CPU 1, coded MPEG data that are stored on a disk 2 are read by a disk interface circuit 3. Buffering is performed for the data when it is transferred to a memory 5 via a bus 4.

Figure 11:
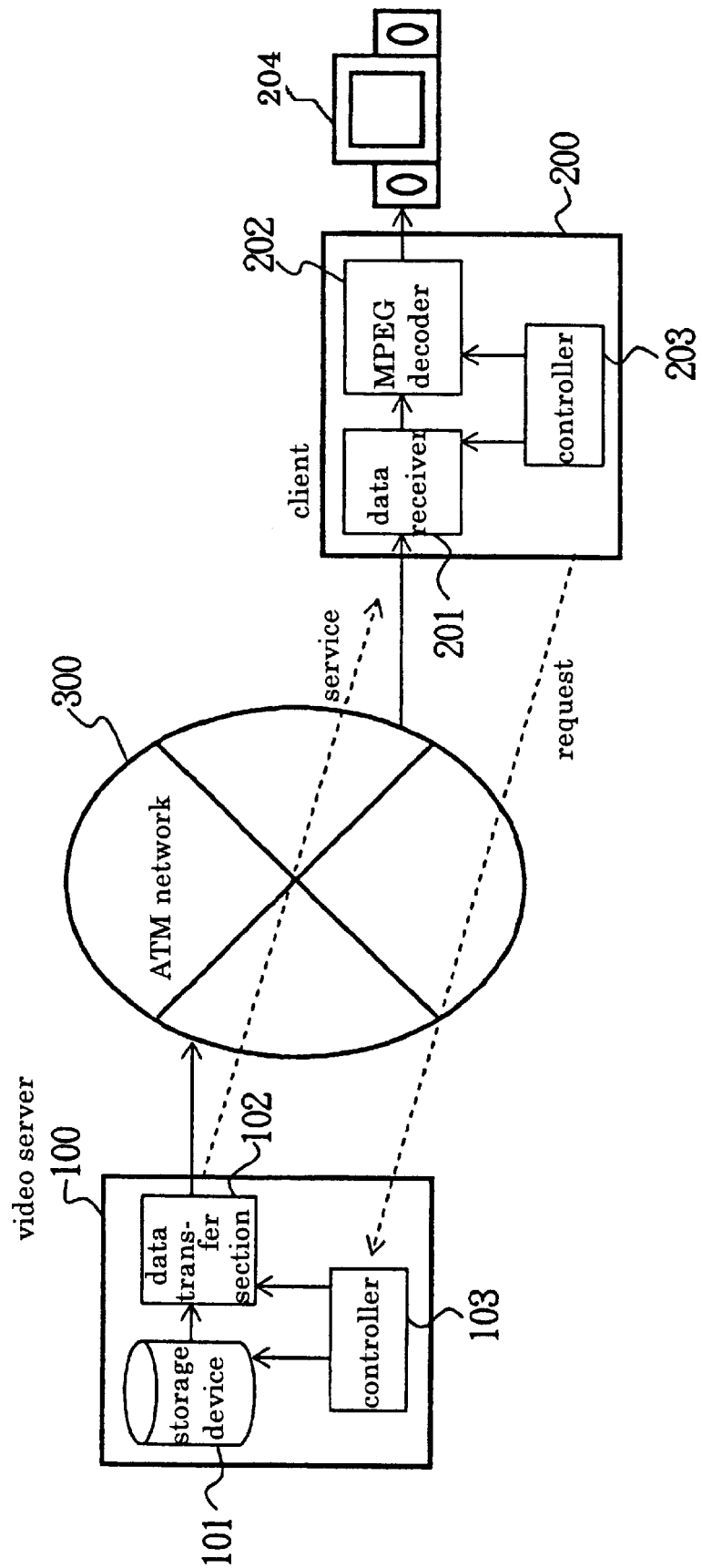
FIG. 11 is a diagram illustrating the general structure of a VOD service.
Figure 12:
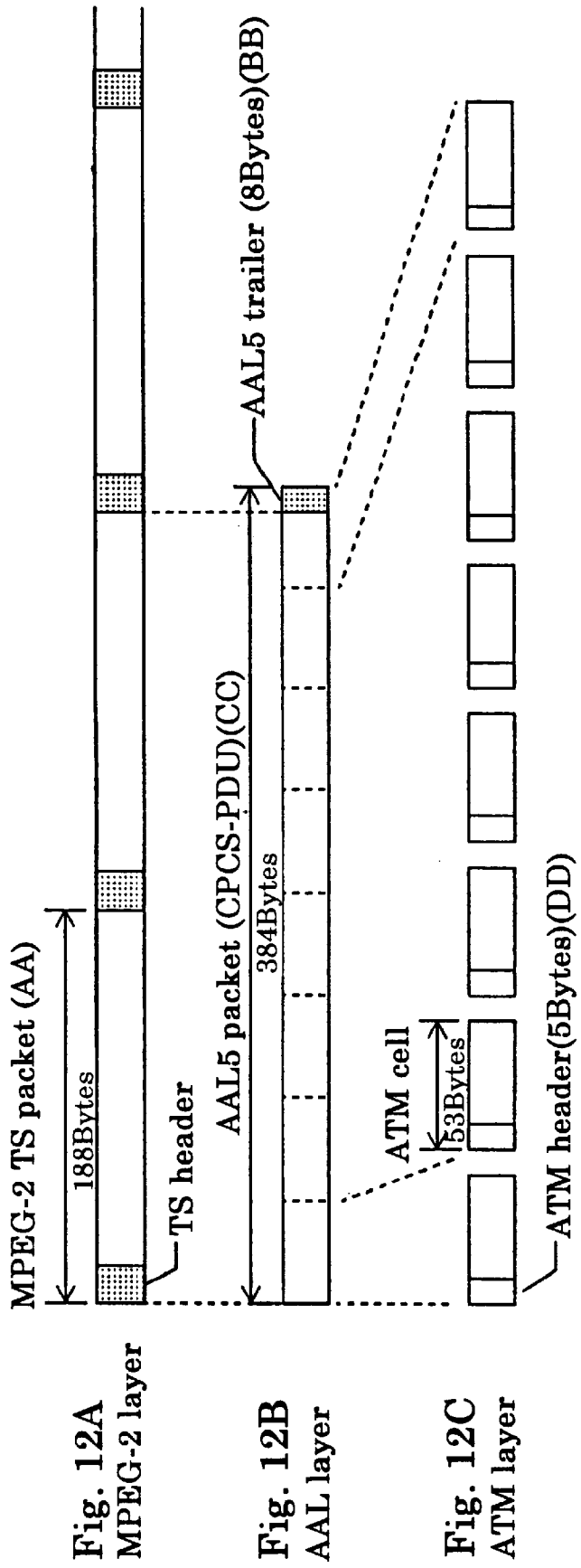
FIGS. 12A, 12B and 12C are diagrams for explaining the standards of a method for the mapping of MPEG data to an ATM cell (MPEG over ATM method)
Figure 13:
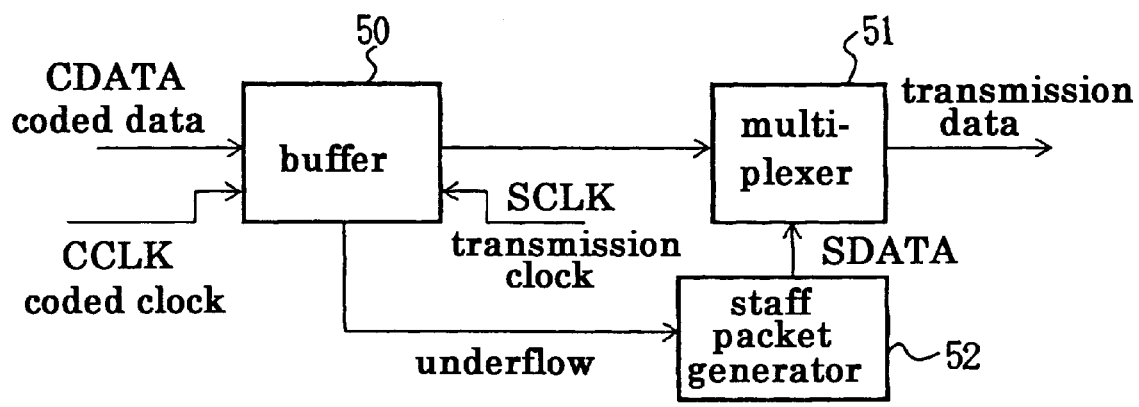
FIG. 13 is a diagram illustrating an example arrangement for the insertion of stuff data (packet) into coded data and the absorption of a speed difference.

An ATM interface circuit 6 employs the MPEG data for which buffering is performed when transferred to the memory 5 to form an ALL-5 packet (see FIG. 12B) and an ATM cell (FIG. 12C), which in turn are transmitted to an ATM network 300 (see FIG. 11).

In order to obtain a high throughput, a fast bus, e.g., a PCI bus, is employed as the bus 4, and a SCSI (Small Computer System Interface) is used for the disk interface circuit 3.

To accommodate more subscribers, the arrangement in FIG. 1 is developed in parallel, so that a video server providing a higher throughput and having a larger storage capacity can be provided.

The MPEG over ATM processing, i.e., the processing during which the MPEG data is formed into an AAL-5 packet and an ATM cell and the rate of transmission is controlled, is performed by the ATM interface circuit 6, as is described above. The example arrangement for the ATM interface circuit 6 is shown in FIG. 2.

The ATM interface circuit 6 includes a bus interface circuit 60, which functions as an interface with an upper host bus 4; a controller 62 for performing an AAL/ATM layer conversion process; a TC layer controller 63 for performing a TC layer process, such as SONET SDH; a transmitter/receiver 64 for functioning as an interface with a network; and a CPU 61.

Figure 2:
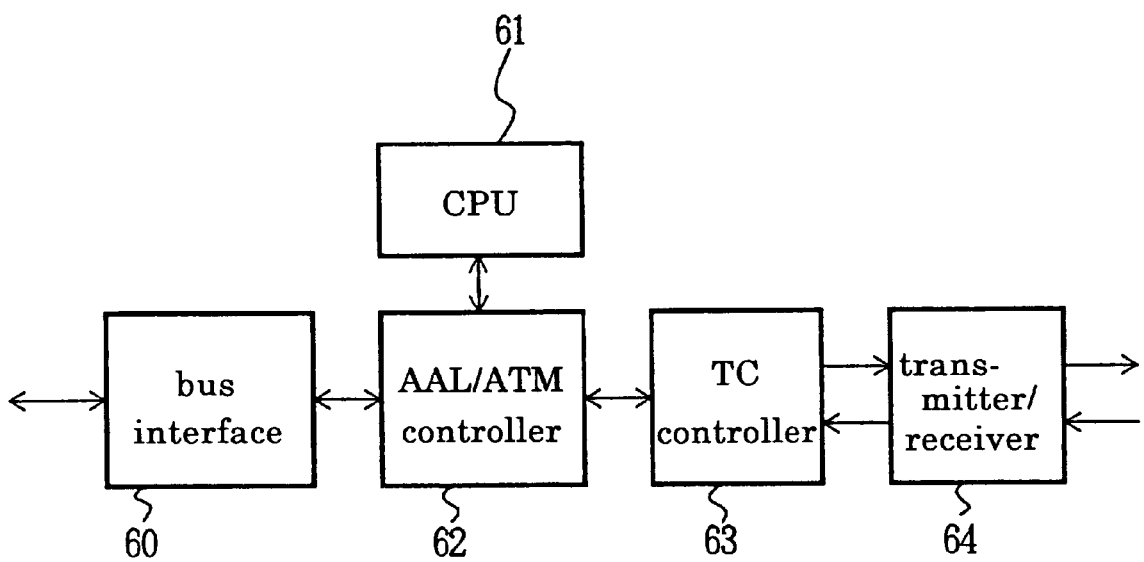
FIG. 2 is a block diagram illustrating an example arrangement for an ATM interface circuit 6 in FIG. 1.

The CPU 61 may be mounted in the ATM interface circuit 6, as is shown in FIG. 2, or it may be the host CPU 1 in FIG. 1. The AAL/ATM layer controller 62, the TC layer controller 63, and the transmitter/receiver 64 can be constructed of commercially available chips that are supplied by several makers, and therefore, no detailed explanation for them will be given.

The MPEG over ATM process and the rate control are performed by the AAL/ATM layer controller 62. When the CPU 61 adds the units of AAL5 packets (CPCS-PDU) to a transmission queue, the AAL/ATM layer process is performed and an ATM cell is output. For data transmission at a specific fixed rate, the rate is so controlled that the transmission queue is not emptied. Details concerning the rate control operation are contained in the user's manual for [ATM Adaptation Layer] Controller MB86686A, which is an AAL/ATM controller produced by Fujitsu Limited, the assignee of the present invention.

The problem that was maintained previously is that an available value for a rate set in the AAL/ATM layer controller 62 is a discrete value.

The present invention, therefore, focused on the fact that a NULL packet is prepared for a packet layer for MPEG2 (see FIG. 12A), and an AAL5-NULL packet, in which two NULL packets (NULL packet×2) are mounted in a payload for an AAL5 packet, is prepared. This AAL5-NULL packet is inserted at a proper location in coded data, which is then transmitted, so that the transmission of the contents at a desired coding rate is enabled.

Figure 3:
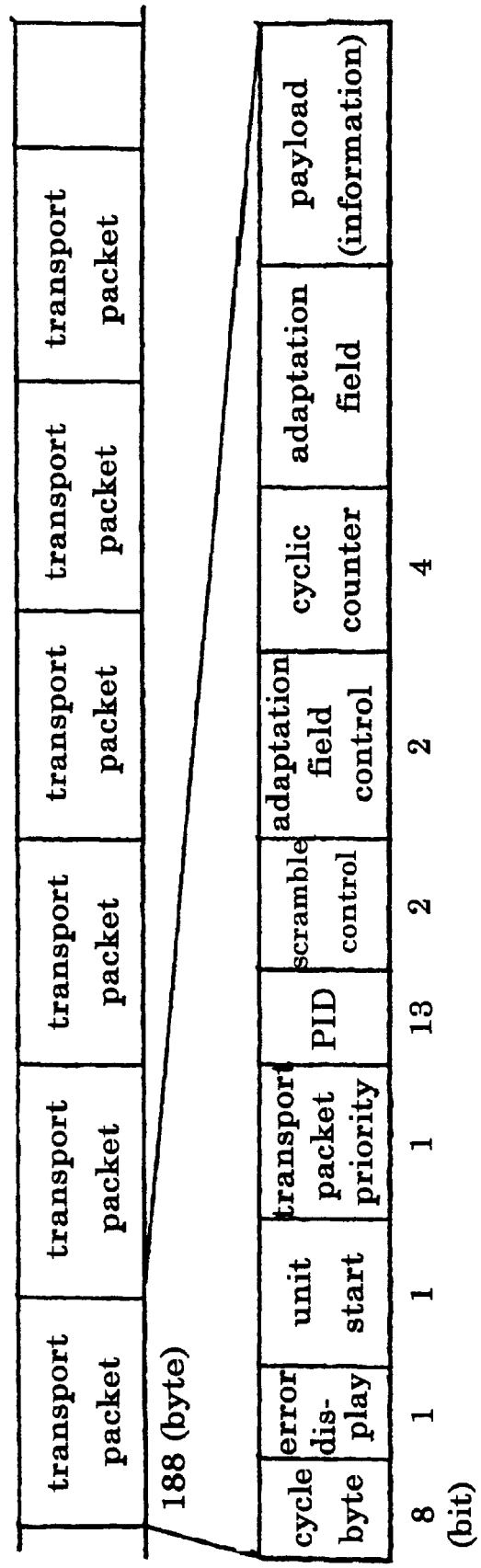
FIG. 3 is a diagram for explaining the structure of an MPEG2 transport stream.

FIG. 3 is a diagram for explaining the contents of a plurality of transport packets that are to be transmitted as an MPEG2 transport stream TS. The transport packet of 188 bytes, which has been explained while referring to FIG. 12, has a packet identification PID of 13 bits. The packet identification PID carries the attribute for the packet for each stream.

When the packet identification PID is 0×1fff, i.e., when 13 bits are all "1s," this means that the pertinent packet is a NULL packet. From the packet identification PID, the reception side can identify a received packet as either a normal packet or a NULL packet. When the received packet is an NULL packet with a TS packet layer, it is abandoned by the MPEG2 decoder at the reception side, so that no particular influence attributable to the insertion occurs.

Figure 4:
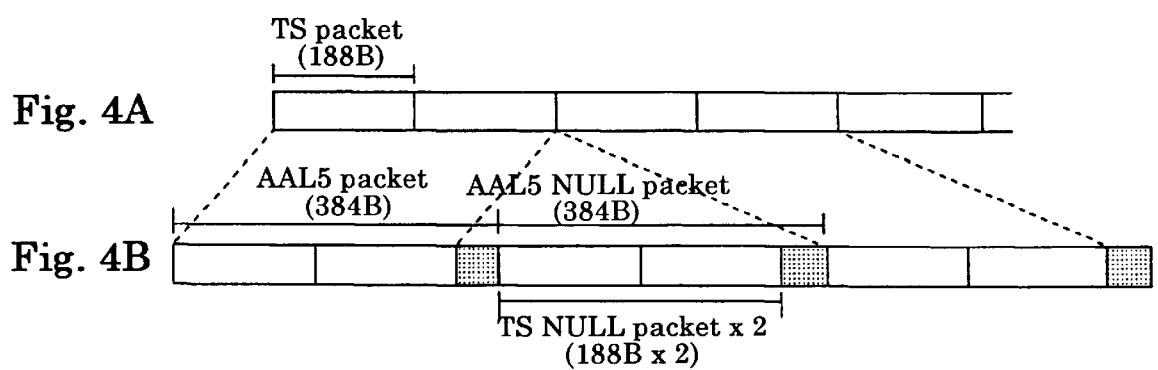
FIGS. 4A and 4B are diagrams for explaining the concept of the insertion of a TS-NULL packet according to the present invention.

The concept of the present invention involving the insertion of a TS-NULL packet is shown in FIGS. 4A and 4B. A set of two 188 byte TS packets (see FIG. 4A) and an eight byte trailer form an AAL5 packet of 384 bytes. A TS-NULL packet of 384 bytes is inserted between such AAL5 packets (see FIG. 4B). The actual problem is determining the AAL5 packet count interval at which an AAL5-NULL packet is to be inserted.

Figure 5:
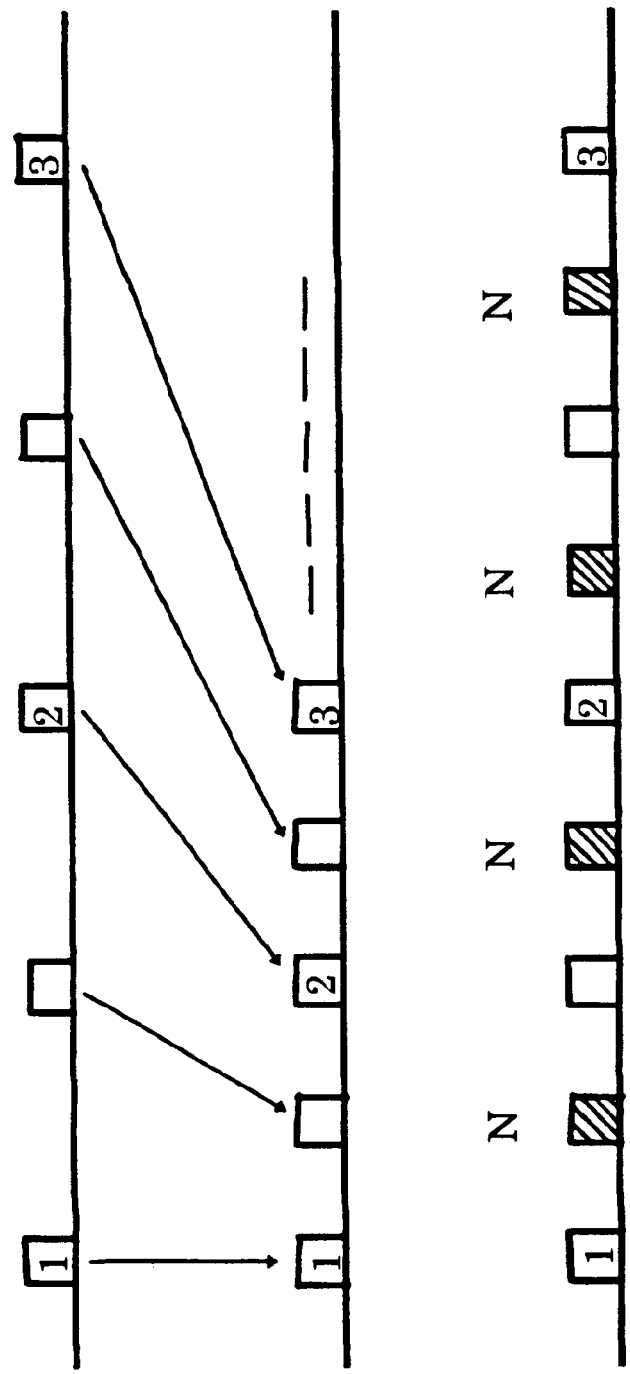
FIGS. 5A, 5B and 5C are diagrams showing an insertion example for a TS-NULL packet according to the present invention.

FIGS. 5A, 5B and 5C depict an example where a NULL packet is inserted. Data packets to be transmitted are shown in FIG. 5A, and transmission clocks are shown in FIG. 5B. When there is a difference between the data packet to be transmitted (FIG. 5A) and the transmission clock (FIG. 5B), the clocks for the data packets to be transmitted are advanced, as is shown in FIG. 5B.

According to the present invention, therefore, as is shown in FIG. 5C, NULL packets (N), whose packet identification PIDs are all 1s, are inserted to maintain the clock timing for the data packets to be transmitted.

The actual problem here again is determining the AAL5 packet count interval at which a NULL packet should be inserted. This calculation method will be now explained.

Assuming that a coded bit rate for the information contents is X and a bit rate for an ATM layer that can be set is Y, the transmission bit rate for the MPEG-TS layer is represented as follows.

$$y \cdot \frac{48}{53} \cdot \frac{376}{384} = \frac{47}{53} y = \alpha y$$

A value 48 is obtained by subtracting a header of five bytes from an ATM cell of 53 bytes (see the ATM layer in FIG. 12C), and a value 376 is obtained by subtracting a trailer of eight bytes from an AAL5 packet of 384 bytes (see FIG. 4B).

Figure 6:
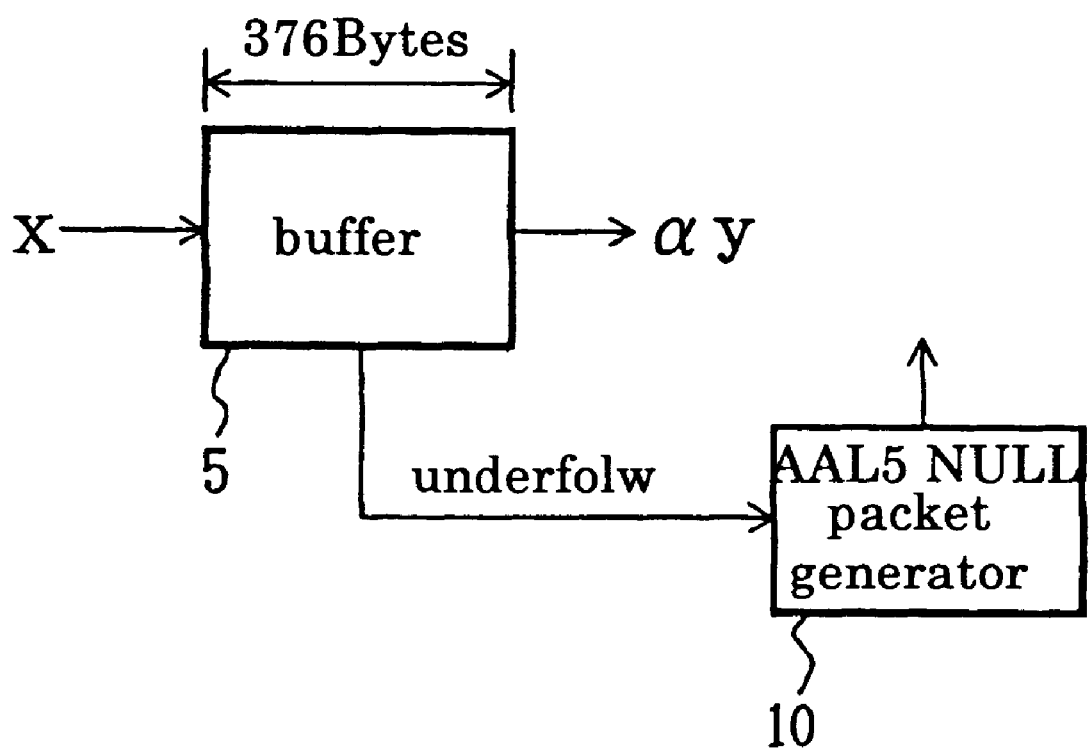
FIG. 6 is a diagram illustrating a logic model for a NULL packet insertion operation.

A logic model for a NULL packet insertion operation is shown in FIG. 6. An underflow occurs in the buffer memory 5 of 376 bytes at a speed of (αy−x) bits. Thus, the time interval at which the underflow occurs is (376×8)/(αy−x).

The number of packets P that can be transmitted in this interval is represented as follows.

$$P = \frac{376 \times 8}{\alpha y - x} \cdot \alpha y \cdot \frac{1}{376 \times 8} = \frac{\alpha y}{\alpha y - x}$$

Assuming that a desired coded bit rate x=6 Mbps and a set bit rate y=7 Mbps, P=29.9090909 . . . In this case, the AAL5-NULL packet generator 10 changes a NULL packet insertion interval between the packet values 29 and 30 to adjust the average packet value to 29.9090909 . . .

Figure 7:
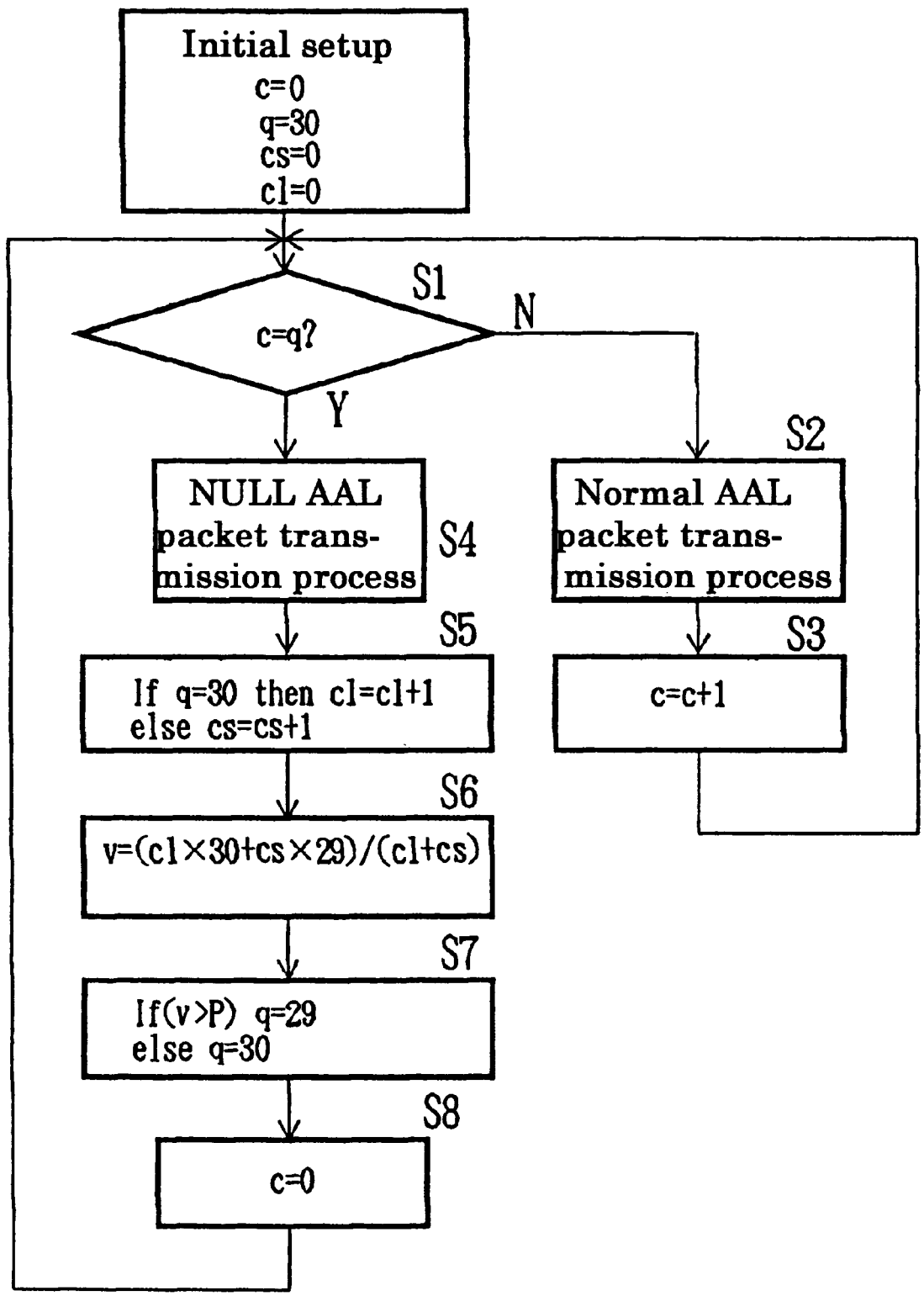
FIG. 7 is a flowchart for one control method for acquiring a packet interval for the insertion of an NULL packet.

Such a control method is shown in the flowchart in FIG. 7. As the initial setup, a packet count value c is 0; an obtained interval q for packet insertion is 30; and current packet count values are cs and cl, which are both set to 0 initially.

For this processing, the packet insertion interval q for the insertion of a NULL packet is set to 30. Each time the NULL packet is inserted, the packet insertion intervals cl and cs in the past are recorded. Based on the cl and cs, the average packet insertion interval v up to the present is calculated, and in consonance with the average interval, the succeeding NULL packet insertion interval q is determined.

More specifically, in the flowchart in FIG. 7, when the packet count value c does not equal the obtained packet insertion interval q (step S1: N), the common AAL packet transmission process is performed (step S2). Then, the packet count value is incremented by one (step S3). The above described process is repeated until the packet count value c equal the obtained packet insertion interval q.

When the packet count value c equals the obtained packet insertion interval q (step S1: Y), a NULL-AAL packet is transmitted (step S4).

When q=30, the count value cl is incremented by one, and When q≠30, the count value cs is incremented by one (step S5). The average packet insertion interval v up to the present is calculated (step S6). The average packet insertion interval v is represented by the following expression:

$v=(cl \times 30 + cs \times 29)/(cl+cs)$.

Then, the average insertion interval v for the packets that have been inserted is compared with the packet insertion interval P that was previously acquired as the average value. When v>P, the obtained packet insertion interval q is set to 30 (step S7).

Thereafter, the packet count value c is set to 0 (step S8) and program control then returns to step S1 to repeat the above processing.

Figure 8:
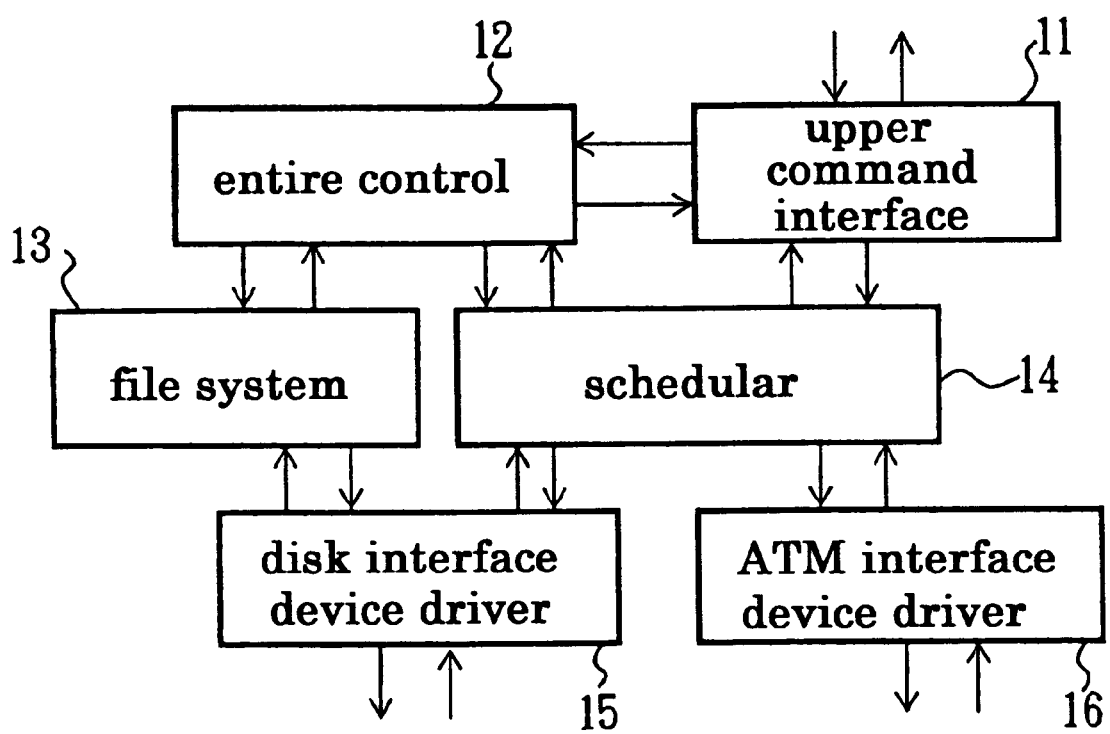
FIG. 8 is a diagram for explaining the module configuration for the processing performed by a CPU of a video server, including the processing for the present invention shown in FIG. 7.

FIG. 8 is a diagram for explaining the module structure for the processing performed by the CPU 1 of the video server 100, including the processing for the present invention in FIG. 7. An upper command interface module 11 has an interface function for commands and messages that are exchanged with the upper controller.

A master control module 12 controls the individual modules (generation and deletion of tasks), and generates a system message. A file system module 13 manages a logic format, information contents, a file directory and data.

A schedular module 14 determines the order in which a disk interface device driver module 15 and an ATM interface device driver module 16 will be accessed so as to guarantee data quality and provide efficient service.

The disk interface device driver module 15 and the ATM interface device driver module 16 are respective groups of device drivers for a disk interface device and for an ATM interface driver.

Figure 9:
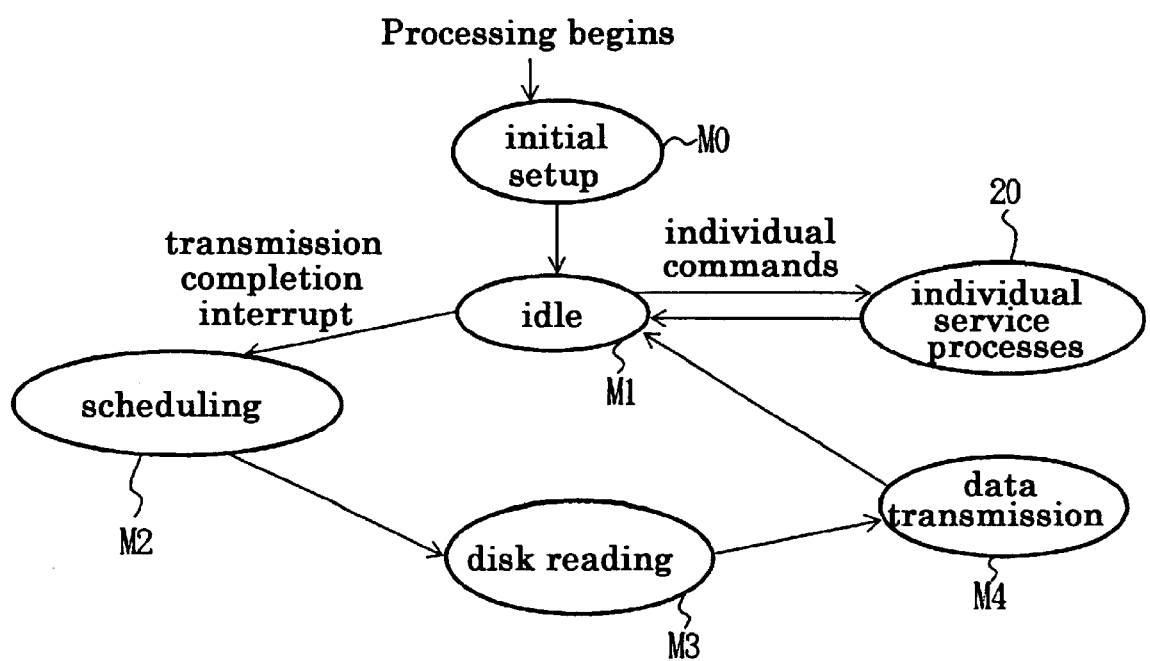
FIG. 9 is a diagram for explaining the processing performed by a schedular module.

Only the portion of the above modules that is directly related to the present invention is shown in FIG. 9. In FIG. 9, when the processing is begun, the initial setup is performed (MO). When the initial setup has been completed, service is begun in accordance with commands originating at the upper level.

There are commands for starting and for terminating service, a special reproduction command, etc.; commands for which individual service processors 20 perform specified processes. When the service for a setup/change of a schedule parameter is begun, on each occasion after data held in the buffer memory 5 is transmitted (the system falls into the idle state: M1), scheduling is performed (M2), data is read from the disk 2 (M3), and the data is transmitted (M4).

For the data transmission process (M4), the ATM interface device driver 16 is called for each AAL packet, and the data in the buffer memory 5, which have been read from the disk 2, are placed in the transmission queue for the ATM interface 6 and transmitted.

The present invention is employed to register a NULL packet in the transmission queue using the above described method.

Further, as an expansion of the present invention, it is possible to include auxiliary data in the above described NULL packet that is to be inserted and to transfer the packet. The reception side can obtain the auxiliary data by extracting it in the course of abandoning the NULL packet.

When the reception side is to decode the stream in which the NULL packet is inserted, in consonance with the transmission clock, in the above described manner, the value of synchronous data (STC) to be used as reference data must be set to a desired value by an encoder on the transmission side.

To do this, a PCR (Program Clock Reference) is included in the transport stream, which is the system for assembling a plurality of programs into one stream (data string). The PCR is located in the adaptation field in the stream in FIG. 3, and consists of six bytes in the MPEG2 data. The PCR value is incremented in consonance with the elapse of transmission time.

Since by itself the PCR value is insufficient, the decoder sets a value indicated by the PCR when the final byte of the 6-byte PCR carried in the transport stream has arrived.

Figure 10:
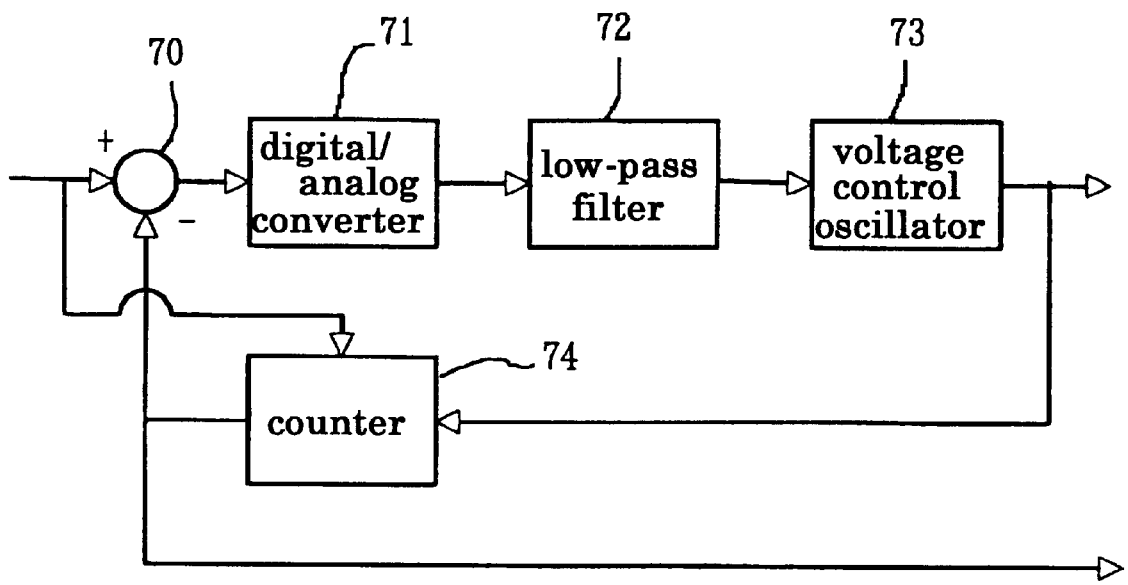
FIG. 10 is a diagram illustrating an example arrangement for a PLL circuit on the reception side.

In FIG. 10 is shown an example arrangement of a PLL (Phase Lock Loop) that is located on the reception side, so that the decoder can obtain an STC having a frequency that matches the system clock of the coder. A phase comparator 70, a digital/analog converter 71, a low-pass filter 72, a voltage control oscillator 73, and a counter 74 constitute a closed feedback circuit.

As is described above, a value carried by the PCR a stream is set to a counter 74 when the final byte of the PCR has arrived. The value set to the counter 74 is incremented in consonance with a frequency of 27 MHz provided by the voltage control oscillator 73.

Therefore, the above described closed feedback circuit can provide a system reference clock having a frequency that completely matches the system clock of the coder.

As is described above in the embodiment of the present invention, according to the rate control method, data contents that have been coded at any rate can be transmitted at a desired rate by using the same hardware. As a result, this method contributes greatly to the reduction of system operating costs.

What is claimed is:

1. A method for controlling a data transfer rate at which coded data are transferred in an asynchronous transfer mode, comprising the steps of:

forming said coded data for an ATM adaptation layer;

calculating an insertion timing for insertion of a NULL packet;

inserting said NULL packet into said coded data of said ATM adaptation layer in consonance with said insertion timing, obtained by the calculation, for said NULL packet; and transferring, in said asynchronous transfer mode, said coded data of said ATM adaptation layer into which said NULL packet has been inserted, wherein insertion timing P for said NULL packet to be inserted is acquired from $$P=\alpha y/(\alpha y-x),$$

where $\alpha=47/53$, x denotes a coded bit rate for said coded data and y denotes an available bit rate for an asynchronous transfer mode layer.

2. A data transfer rate control method according to claim 1, wherein said coded data is formed as an MPEG (Motion Picture Experts Group)2 TS packet, and wherein said ATM adaptation layer is constituted by an ATM adaptation layer 5 packet.

3. A data transfer rate control method according to claim 2, wherein auxiliary data is included in said NULL packet to enable transfer of said auxiliary data.

4. The method according to claim 1, wherein auxiliary data is included in the NULL packet to enable transfer of said auxiliary data.

5. A data transfer rate controller comprising:

an accumulator for accumulating coded data;

an interface circuit for converting data read from said accumulator into a packet for an ATM adaptation layer;

a buffer memory used as an output buffer for said interface circuit;

an asynchronous transfer mode interface circuit for converting data output from said buffer memory into data in an asynchronous transfer mode for performing a data transfer process; and a controller for inserting a NULL packet into said ATM adaptation layer at a predetermined timing interval before a packet of said ATM adaptation layer is accumulated in said buffer memory;

wherein insertion timing P for said NULL packet to be inserted is acquired from $$P=\alpha y/(\alpha y-x),$$

where $\alpha=47/53$, x denotes a coded bit rate for said coded data and y denotes an available bit rate for an asynchronous transfer mode layer.

6. A data transfer rate controller according to claim 5, wherein said coded data is formed as an MPEG (Motion Picture Experts Group)2 TS packet, and wherein said ATM adaptation layer is constituted by an ATM adaptation layer 5 packet.

7. The data transfer rate controller according to claim 5, wherein auxiliary data is included in the NULL packet to enable transfer of said auxiliary data.

* * * * *